Patented Nov. 5, 1946

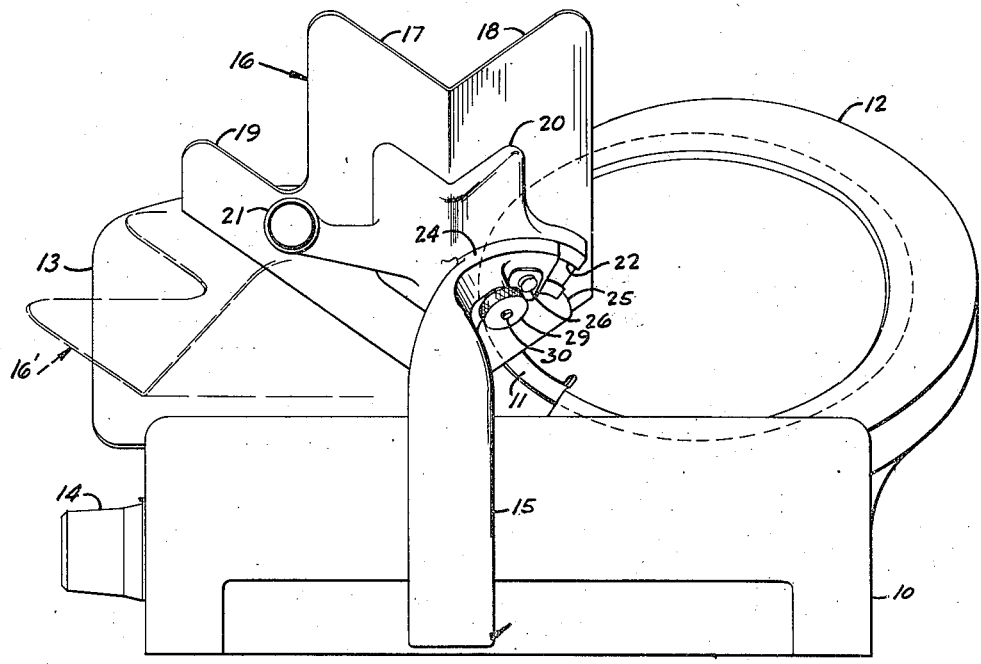
FIG. I
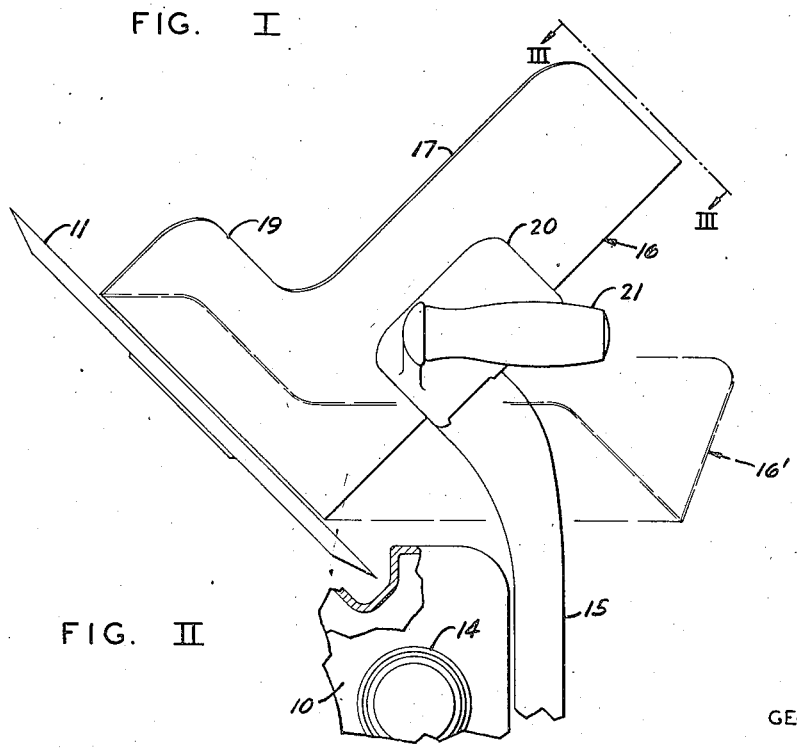
FIG. II
INVENTOR.
GEORGE R. WOOD
BY
*[signature]*
ATTORNEY

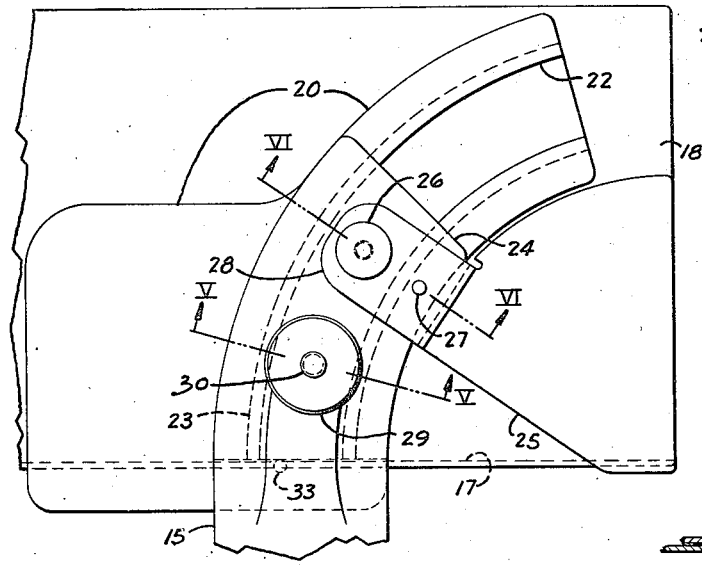
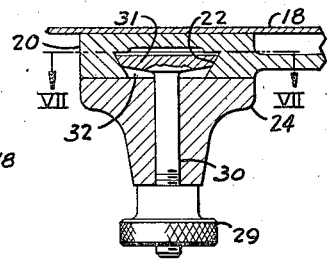
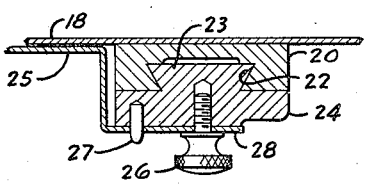
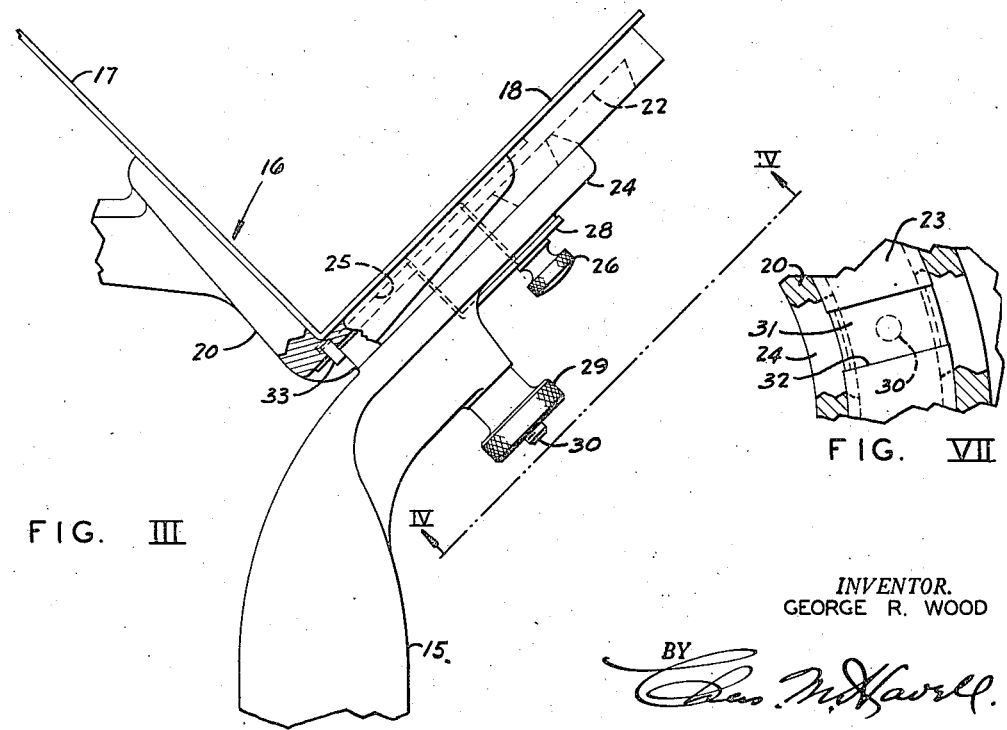

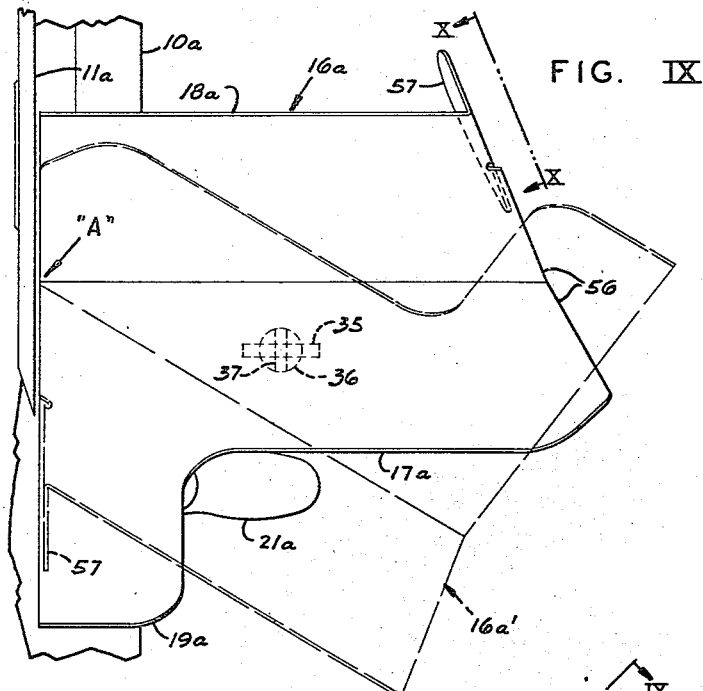
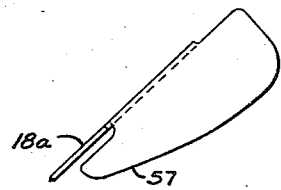
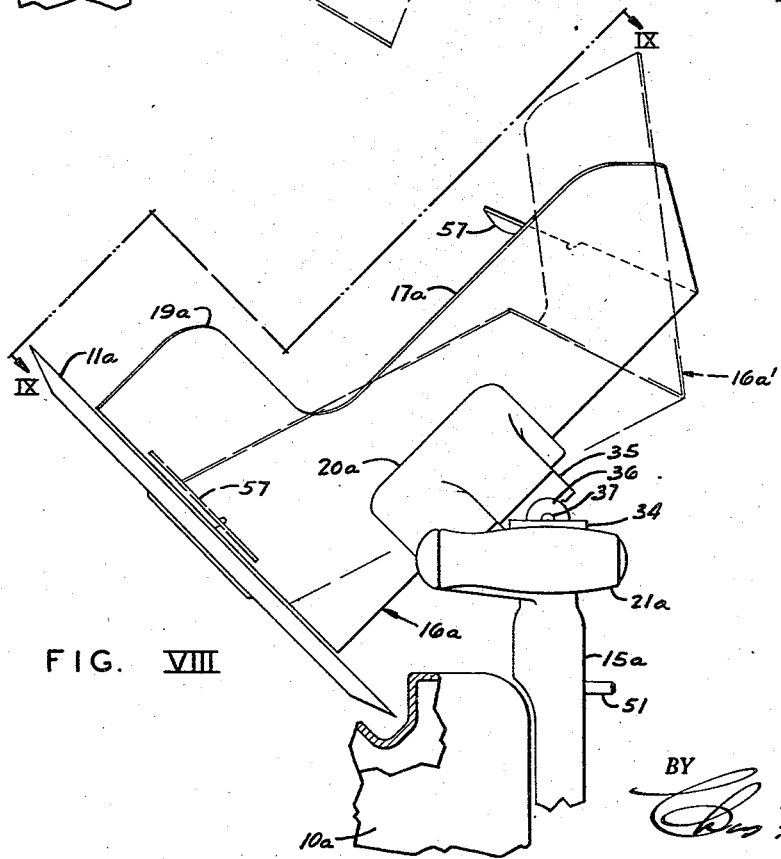

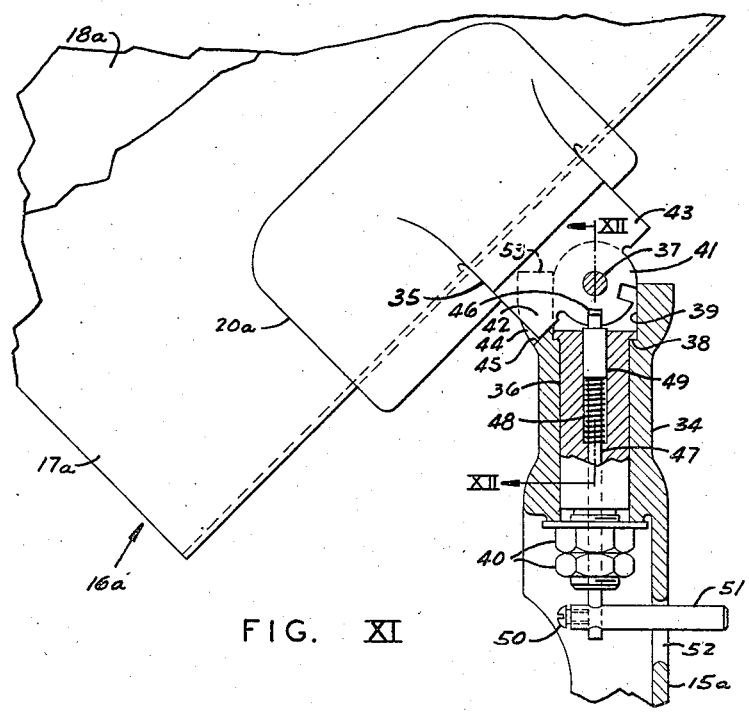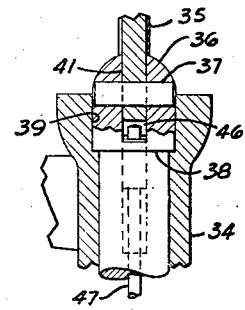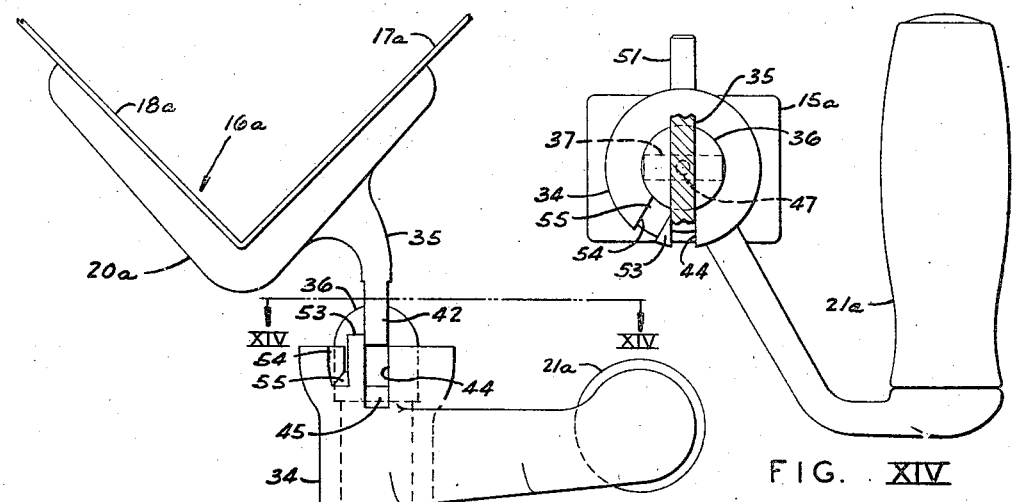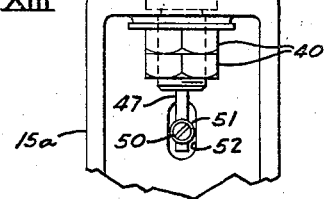

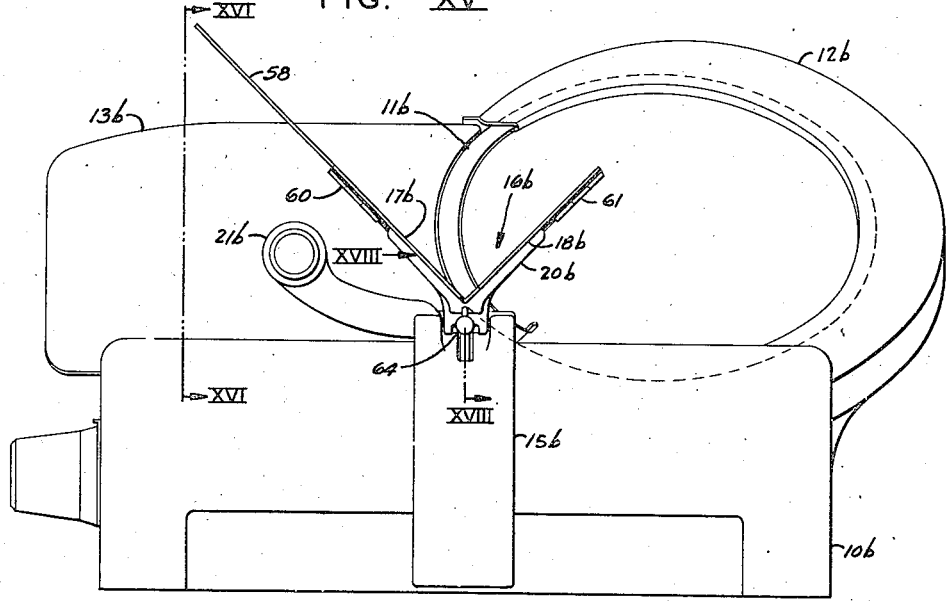
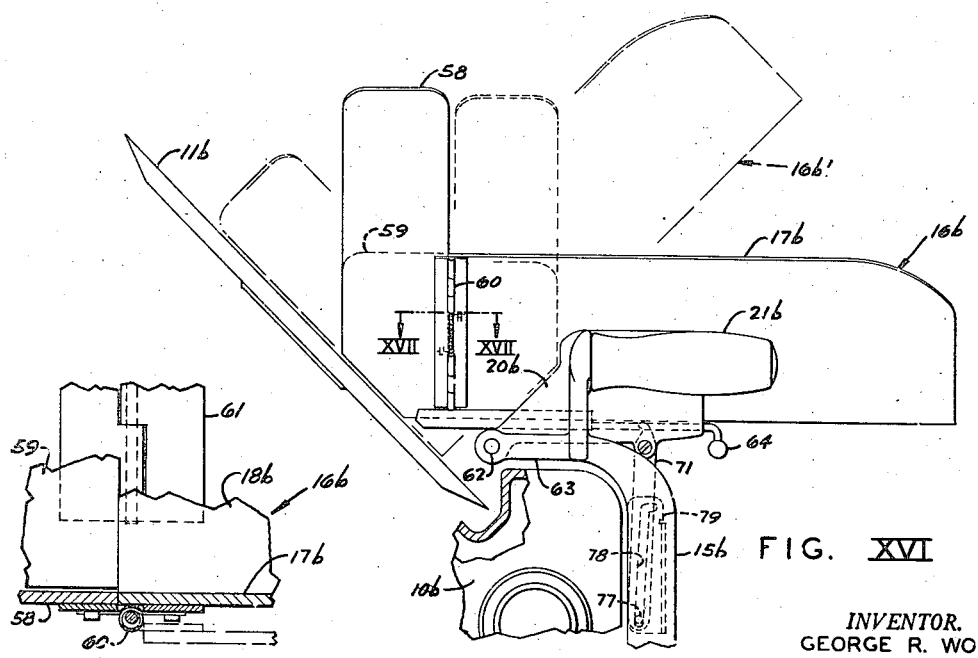

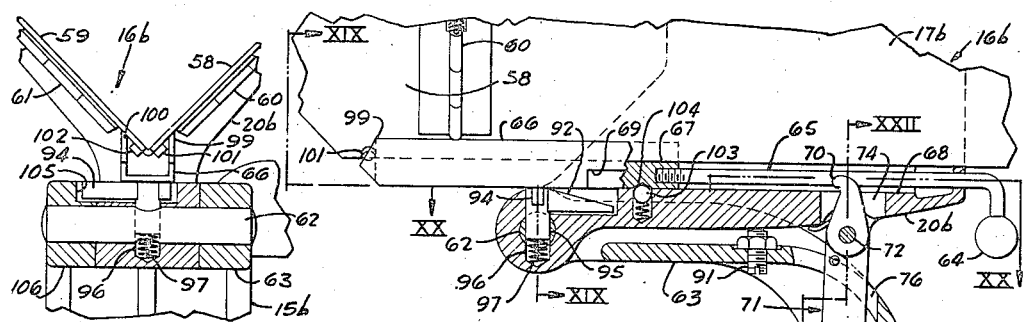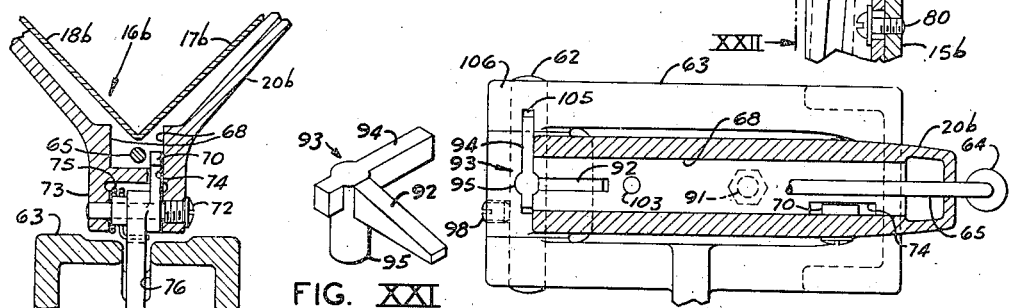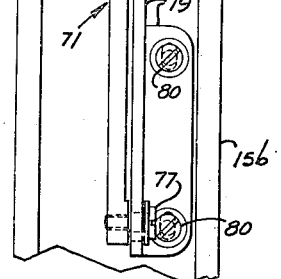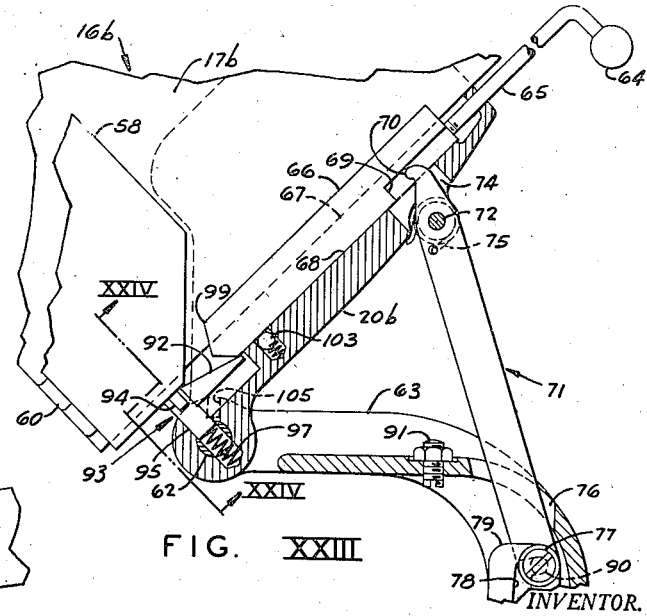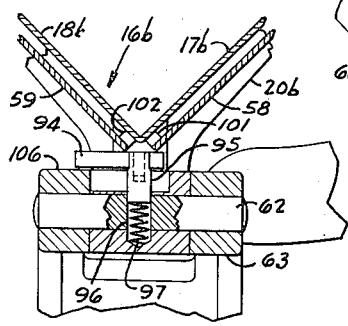

2,410,698

UNITED STATES PATENT OFFICE 2,410,698

MEAT SLICING MACHINE

George R. Wood, Montreal, Quebec, Canada, assignor to Toledo Scale Company, Toledo, Ohio, a corporation of New Jersey Application April 12, 1943, Serial No. 482,770

4 Claims. (Cl. 146—102)

This invention relates to food handling apparatus, particularly slicing machines, of the type in which a commodity to be sliced is carried in an inclined commodity-supporting member which reciprocates past the cutting edge of a circular rotary knife, the commodity being fed downwardly by gravity into engagement with the face of a gauge plate which is substantially parallel to the plane of the knife edge and is adjustable in a direction generally perpendicular thereto, to vary the thickness of the slice severed during each stroke.

The commodity-supporting member of a slicing machine, usually called the commodity tray, comprises a trough-like member which is mounted on the base of the slicing machine and is adapted to move back and forth to carry the unsliced piece of commodity past the exposed cutting edge of the knife. A commodity tray usually is permanently disposed with its longitudinal axis perpendicular to the plane of the rotary knife, causing the commodity to be severed in a series of planes perpendicular to its axis. Such cuts perpendicular to the longitudinal axis of the commodity are satisfactory if the commodity has a large cross-sectional area, as in the case of large Bologna, bacon and boiled ham. However, many commodities, such as ring Bologna, sausage, Thuringer and others, have a small diameter, and are preferably sliced on an angle to provide slices of larger size. Such commodities are both difficult and dangerous to slice on an angle with the conventional slicing machine and hence are usually sliced by hand.

The principal object of the invention is to provide a simply operated and compact device in which a commodity may be sliced either perpendicular to or at an angle to its axis. More specific objects and advantages are apparent from the description, in which reference is had to the accompanying drawings illustrating preferred embodiments of the invention.

In the drawings:

Fig. I is a view in elevation of a slicing machine of the gravity feed type, having a commodity tray embodying the invention.

Fig. II is an enlarged fragmentary view, partly in elevation and partly in section, taken from the left side of Fig. I.

Fig. III is a further enlarged fragmentary view of the commodity tray, certain parts being broken away, taken substantially on the line III—III of Fig. II.

Fig. IV is a fragmentary view, taken substantially on the line IV—IV of Fig. III.

Fig. V is a detailed sectional view showing the commodity tray locking means taken substantially on the line V—V of Fig. IV.

Fig. VI is a detailed cross sectional view taken substantially on the line VI—VI of Fig. IV.

Fig. VII is a fragmentary view, with parts broken away, taken substantially on the line VII—VII of Fig. V.

Fig. VIII is a fragmentary view similar to Fig. II of a modified form of commodity tray embodying the invention.

Fig. IX is a fragmentary plan view taken on the line IX—IX of Fig. VIII.

Fig. X is a fragmentary view in elevation of a hand guard taken on the line X—X of Fig. IX.

Fig. XI is a fragmentary front view, partly in elevation and partly in section, of the hinging and locking means employed in the modified form of commodity tray illustrated in Fig. VIII.

Fig. XII is a fragmentary view taken substantially on the line XII—XII of Fig. XI.

Fig. XIII is a fragmentary side elevational view showing the commodity tray in a horizontal position.

Fig. XIV is a plan view taken substantially on the line XIV—XIV of Fig. XIII.

Fig. XV is a view in elevation, similar to Fig. I, of still another modification of the commodity tray embodying the invention.

Fig. XVI is an enlarged fragmentary view, partly in elevation and partly in section, of the modified form of the invention illustrated in Fig. XV, taken substantially from the position indicated by the line XVI—XVI of Fig. XV.

Fig. XVII is an enlarged detailed fragmentary sectional view taken substantially on the line XVII—XVII of Fig. XVI.

Fig. XVIII is an enlarged fragmentary view, partly in section and partly in elevation, showing the commodity tray in horizontal position, taken substantially on the line XVIII—XVIII of Fig. XV.

Fig. XIX is a fragmentary vertical sectional view taken substantially on the line XIX—XIX of Fig. XVIII.

Fig. XX is a horizontal sectional view taken substantially on the line XX—XX of Fig. XVIII.

Fig. XXI is a view in perspective of a locking member employed in the modified form of the invention illustrated in Figs. XV to XXIV.

Fig. XXII is a vertical sectional view taken substantially on the line XXII—XXII of Fig. XVIII.

Fig. XXIII is a view similar to Fig. XVIII, but showing the commodity tray in an inclined position.

Fig. XXIV is a fragmentary sectional view taken substantially on the line XXIV—XXIV of Fig. XXIII.

These specific drawings and the specific description that follows merely illustrate and disclose the invention and are not intended to impose limitations upon the claims.

The slicing machine shown in Figs. I to VII comprises a base 10 upon which are erected driving and journaling means (not shown) for a circular rotary knife 11, which is guarded by means of a knife guard 12 and a gauge plate 13 also mounted on the base. The rotary knife, knife guard and gauge plate in a splicing machine of the gravity feed type are usually disposed at an angle of substantially 45° to the vertical. The face of the gauge plate 13 is parallel to the plane of the edge of the rotary knife 11, and the edge of the gauge plate is closely adjacent the exposed edge of the knife. By means of an adjusting knob 14 located on the front of the base 10, the gauge plate 13 is adjustable to regulate the thickness of the slices severed from the commodity.

A carriage 15 is reciprocally mounted on the base 10 to carry a commodity tray 16 past the exposed edge of the rotary knife 11. The commodity tray 16 serves to support the unsliced commodity and comprises a trough-shaped structure, having two converging side members 17 and 18 positioned perpendicular to the plane of the knife edge, and intersecting each other substantially at right angles. An upwardly directed extension of the member 17 serves as a hand guard 19 to protect the operator's hand from the knife. The lower end of the commodity tray is located closely adjacent the plane of the knife edge to provide maximum support for the commodity along the cutting plane.

The commodity tray 16 is attached by means of concealed fastenings (not shown) to a V-shaped bracket 20, having a handle 21 by which the commodity tray is manually reciprocated. Milled into the under side of the rearwardly extending portion of the bracket 20 is an arcuate dovetail slot 22 which engages a cooperating dovetail tongue 23 milled onto an obliquely directed arcuate arm 24, integral with the carriage 15. The cooperating dovetails 22 and 23 lie in a plane that is perpendicular to the cutting plane of the machine and is perpendicular to the plane of the side member 17 of the tray 16, their center of arcuate curvature being located substantially on the intersection of the cutting plane of the machine and the plane of the side member 17. By means of this construction the inclined commodity tray 16 may be rotated to a horizontal position as shown by the dashed lines 16' (see Figs. I and II), or to any intermediate position, the elevated end of the tray swinging downward and forward, about an axis substantially coincident with the intersection of the cutting plane of the machine and the plane of the side member 17, the edge of the side member 17 adjacent the cutting plane of the machine remaining in close proximity thereto and providing the necessary support for the commodity. As the commodity tray 16 swivels toward a horizontal position, an angular gap results between the cutting plane of the machine and the adjacent edge of the side member 18 of the tray 16. To support the commodity properly at this gap, there is provided beneath the side member 18 a segmental plate 25 detachably secured, so as to be removable for cleaning, by means of a knurled screw 26 and a locating pin 27 which pass through a suitably formed ear 28 on the plate 25, the screw 26 being threaded into the arm 24 of the carriage 15. One edge of the plate 25 is located adjacent the cutting plane of the device, and being attached to the arm 24, remains in a fixed position, providing ample support for the commodity when the tray 16 is moved into an intermediate or horizontal position.

A clamping means is provided to lock the commodity tray in any desired position, comprising a knurled thumb nut 29 threaded onto a stud 30, the opposite end of which terminates in a trapezoidal locking wedge 31 which cooperates with the dovetail slot 22. The locking wedge 31 is recessed in a groove 32 milled transversely across the dovetail tongue 23, the stud 30 extending through a boss on the arm 24. Tightening the nut 29 forces the locking wedge 31 into clamping engagement with the converging walls of the dovetail slot 22. A pin 33, fixed in the bracket 20 and projecting into the slot 22, serves as a stop contacting the end of the dovetail tongue 23 when the commodity tray is rotated into a position perpendicular to the edge of the knife 16. Movement of the tray beyond this point might force the edge of the side member 18 into the plane of the knife edge and thus lead to damaging of the knife.

The embodiment of the invention shown in Figs. VIII to XIV comprises a base 10a upon which is mounted a circular rotary knife 11a similarly inclined from the vertical. A carriage 15a is reciprocally mounted on the base 10a to carry a commodity tray 16a, having intersecting side members 17a and 18a normally perpendicular to the plane of the knife edge. The commodity tray 16a is fastened to a V-shaped bracket 20a universally mounted atop a post 34 extending upwardly from the reciprocable carriage 15a, to which is attached a handle 21a. A depending arm 35 integral with the bracket 20a engages a bifurcation in the upper end of a pin 36 swivelably mounted in the post 34. The arm 35 pivots about a horizontal axis on a pintle 37. The pin 36 is provided with a shoulder 38 which is seated in a counterbore 39 in the post 34, and is retained in place by means of nuts 40 threaded onto its lower end. The lower end of the arm 35 that engages the bifurcation in the pin 36 has a semicircular hub portion 41, through a bore in the center of which extends the pintle 37. Adjacent the hub 41 on either side are lugs 42 and 43, the lug 42 being adapted to engage a slot 44 milled radially through one side of the annular upper end of the post 34. The shape and location of this slot is such that when the lug 42 is in engagement therewith, and the under side of the lug contacts the bottom 45 of the slot, the longitudinal axis of the commodity tray 16a is perpendicular to the plane of the edge of the knife 11a. A notch 46 milled transversely in the periphery of the hub 41 is adapted to be engaged by the upper end of a locking rod 47 to lock the commodity tray in position perpendicular to the edge of the knife. The locking rod 47 is located in a bore extending through the center of the pin 36, and is urged into locking engagement by means of a compression spring 48, located in a counterbore in the pin, which exerts an upward force against an annular collar 49 integrally formed on the rod 47. Attached by means of a set screw 50 to the lower end of the locking rod 47 is a release knob 51, which projects through a slotted opening 52 in the wall of the carriage 15a, thus being accessible for manipulation. By downward pressure on the release knob 51, the locking rod 47 is withdrawn from the notch 46 in the hub 41, and permits the commodity tray 16a to be rotated about the horizontal axis of the pintle 37 to a horizontal position, in which the under side of the lug 43 engages the surfaced annular upper end of the post 34, checking the pivoting of the tray about the pintle 37.

The commodity tray 16a is then sufficiently clear of the gauge plate and knife 11a to allow it to be rotated horizontally in a counter-clockwise direction about the axis of the pin 36 (see Fig. IX), while the under sides of the lugs 42 and 43 slidingly engage the upper annular surface of the post 34 and maintain the horizontal condition of the tray. The tray is rotated horizontally until the lug 43 engages a stop 53 projecting upwardly from the annular end of the post 34. In this position the lug is in alignment with another slot 54 milled radially through the annular end of the post 34. The location of the slot 54 is such that, when the tray is again rotated about the horizontal pintle 37 so that the lug 43 enters the slot 54, the opposite end of the commodity tray 16a is adjacent the cutting plane of the machine, its axis being disposed angularly thereto, as shown by the dashed lines 16a' in Figs. VIII and IX. The under side of the lug 43 contacts the bottom 55 of the slot 54 to limit the inclination of the tray so that the end of the tray is properly positioned adjacent the cutting plane of the knife 11a. The end 56 of the tray 16a that is positioned adjacent the cutting plane of the device for angularly slicing a commodity is so designed as to be parallel and closely adjacent the cutting plane to support the commodity properly. (See Figs. VIII and IX.) A hand guard 19a is provided when the tray 16a is positioned for slicing in a plane perpendicular to the axis of the tray, and when the tray is positioned as shown by dashed lines 16a' in Figs. VIII and IX to produce angular slices, a hand guard 57 is provided. The longitudinal axis of the tray 16a is offset from the pivotal axis of the pin 35, as may be seen in Figs. IX and XIII, insuring that the apex of the trough in either of the two positions of the tray intersects the cutting plane of the machine at substantially the same point, as shown at "A" Fig. IX.

As shown in Figure IX, the side member 17a of the tray 16a extends to the right beyond the side member 18a. When the tray is in the reversed position, shown in dotted lines, this extension of the side member 17a forms a continuation of such side member substantially to the plane of the knife edge, so as to furnish proper support for the commodity.

A further embodiment of the invention, shown in Figs. XV to XXIV, comprises a base 10b upon which are mounted a similar circular rotary knife 11b, knife guard 12b and gauge plate 13b. A carriage 15b, manually reciprocable on the base 10b by means of a handle 21b, is adapted to carry a commodity tray 16b back and forth past the exposed cutting edge of the knife 11b.

The commodity tray 16b, having two integral side members 17b and 18b intersecting substantially at right angles, has its longitudinal axis normally perpendicular to the plane of the edge of the rotary knife, as shown by the dashed lines 16b' in Fig. XVI. Two plates 58 and 59 are hinged, by means of spring-actuated hinges 60 and 61, to the side members 17b and 18b respectively at their ends adjacent the rotary knife 11b. The spring-actuated hinges 60 and 61 tend to keep the plates 58 and 59 folded back against the side members of the tray. The plate 58 extends upwardly to provide a guard for the operator's hand. Pivotally mounted on a pintle 62, journaled in a bifurcated horizontally disposed arm 63 of the carriage 15b, is a V-shaped bracket 20b to which is fastened the commodity tray 16b.

Assuming that the commodity tray 16b is in its normal position, perpendicular to the plane of the knife edge, as shown by dashed lines in Fig. XVI, in which position it produces cuts perpendicular to the axis of the commodity, the operator desiring to slice a commodity on an angle first pulls outwardly on a handle 64, fixed to the end of a rod 65 projecting from the bracket 20b, to the other end of which is fastened a slide 66. The slide 66 has, milled into its upper surface, a longitudinally extending V-groove 67 adapted to slide along the bottom of the commodity tray, and also is guided by ways 68 provided in the bracket 20b. Into a short rabbet 69, machined along one corner of the slide 66, extends the short upper arm 70 of a supporting lever 71. The lever 71 is fulcrumed on a tenon screw 72 threaded into one of a pair of depending ears 73 which are positioned one on either side of a slot 74 in the bracket 20b through which the arm 70 extends. The lever 71 is urged in a counter-clockwise direction (see Fig. XXIII) by a helical spring 75. The long arm of the lever 71 extends downwardly through a slot 76 into the interior of the carriage 15b, and has threaded to its lower end a shouldered screw 77, the shouldered portion of which is slidingly guided in a slot 78 cut into an angle guide bracket 79 adjustably fastened within the carriage 15b by means of screws 80.

Pulling outwardly on the handle 64 moves the end wall of the rabbet 69 into contact with the end of the short lever arm 70, and thus rotates the supporting lever 71 clockwise against the bias of the spring 75 to disengage the shouldered portion of the screw 77 from a horizontally directed offset 90 at the upper end of the slot 78. This allows the commodity tray 16b to be lowered into its horizontal position, with the underside of the bracket 20b engaging an adjustable stop screw 91 suitably positioned in the arm 63 of the carriage 15b.

The end of the tray 16b formerly adjacent the cutting plane of the machine has then moved away from such plane, and adequate support for the commodity is provided in the following manner: The handle 64 is moved in the opposite direction, i. e. toward the bracket 20b, moving the slide 66 to the left. The end of the slide 66 opposite the handle 64 is adapted to over-ride a cam surface 92 machined on one arm of a locking member 93. This locking member 93 comprises, not only the arm having the cam surface 92, but also a cross arm 94 perpendicular thereto, both radiating from a cylindrical body 95. The locking member is recessed into the hub of the bracket 20b, and the cylindrical body 95 is positioned in a bore 96 of sufficient depth to receive a compression spring 97, interposed between the locking member and the bottom of the bore, to urge the locking member 93 upwardly. The bore 96 extends through the pintle 62, which is keyed to the bracket 20b by means of a set screw 98 and rotates therewith. Under the bias of the spring 97 the locking member 93 is urged into engagement with the lower edges of the plates 58 and 59, holding them in folded position against the tray 16b.

As the slide 66 is moved to the left it slides over the cam surface 92, depressing the locking member 93 against the bias of the spring 97 into the recess provided in the hub of the bracket 20b, and permitting the slide to pass over the upper surface of the locking member. This disengages the cross arm 94 and the plates 58 and 59, allowing the upper advancing corners 99 and 100 of the slide 66 to slide beneath the plates 58 and 59 and swing them out of folded position about the axes of their hinges, against the bias of the springs associated therewith. The slide is moved to the left until it contacts the stops 101 and 102 riveted to the plates 58 and 59, and a spring-pressed ball 103 then enters a conical depression 104 formed in the underside of the slide 66, providing a yieldable lock to prevent the accidental movement of the slide. The plates 58 and 59 then form an extension of the tray 16b, supported by the slide 66, each having one edge closely adjacent the cutting plane of the machine to support the commodity along said plane (see Figs. XVI and XVIII). During these operations the carriage 15b should be pulled back toward the operator as far as it will go and the gauge plate should be in open position to provide clearance for the movement of the plates 58 and 59.

To return the commodity tray 16b to the position for severing slices perpendicular to the axis of the commodity, it is necessary to repeat the above operations in the reverse order. By means of the knob 64 the slide 66 is withdrawn from beneath the plates 58 and 59, which by reason of the spring-actuated hinges 60 and 61 automatically fold back against the side members of the tray 16b to which they are hinged. Further movement of the slide 66 releases the locking member 93, which under the bias of the spring 97 moves up into holding engagement with the lower edges of the plates 58 and 59. The commodity tray may then be rotated about the axis of the pintle 92 to its inclined position, coming to a stop when the shouldered portion of the screw 77, mounted on the lower end of the supporting lever 71, snaps into locking position in the offset 90 at the upper end of the slot 78 of the guide bracket 79.

To prevent the operator from inadvertently moving the commodity tray from its horizontal position to its inclined position before the plates 58 and 59 have been folded back against the tray, and thus damaging the plates or the knife, and to prevent the plates from being forced out into contact with the knife when the tray is in its inclined position, an interlock is provided. This interlock comprises a slot 105 milled into the periphery of the boss 106 of the arm 63 (see Figs. XIX and XX), adapted to receive the cross arm 94 of the locking member 93, which locks the bracket 20b and the carriage 15b against relative movement until the slide 66 has released the locking member 93 after the plates have been folded back by permitting the cross arm 94 to rise out of the slot 105. When the tray 16b is in an inclined position, the cross arm 94 is against the periphery of the boss 106 (see Figs. XXIII and XXIV), and thus prevents the depression of the locking member 93 by the slide 66, in addition to holding the plates 58 and 59 in folded position.

The embodiments of the invention herein disclosed may be modified to meet various requirements.

Having described my invention, I claim:

1. In a slicing machine having a circular rotary knife, a commodity holder mounted for reciprocation relative to the knife in a direction generally parallel to the plane of the knife edge, the commodity-holding portion of said commodity holder consisting of a trough in which a commodity is movable in a direction transverse to the plane of the knife edge, one end of the commodity-supporting portion of the trough being cut off substantially along a plane transverse to the trough, and the other end of the commodity-supporting portion of the trough being cut off substantially along a plane at a substantial angle to the last mentioned plane, and means for selectively fixing the trough in reversed positions with either of its ends substantially in the plane of the knife edge and with its axis intersecting the plane of the knife edge in the same general vertical plane.

2. In a slicing machine having a circular rotary knife, a commodity holder mounted for reciprocation relative to the knife in a direction generally parallel to the plane of the knife edge, the commodity-holding portion of said commodity holder consisting of a trough in which a commodity is movable in a direction transverse to the plane of the knife edge, one end of the commodity-supporting portion of the trough being cut off substantially along a plane transverse to the trough, and the other end of the commodity-supporting portion of the trough being cut off substantially along a plane at a substantial angle to the last mentioned plane, and means for selectively fixing the trough in reversed positions with either end of the trough substantially in the plane of the knife edge.

3. In a slicing machine having a circular knife rotatable on an inclined axis, a commodity holder mounted for reciprocation relative to the knife in a direction generally parallel to the plane of the knife edge, the commodity-holding portion of said commodity holder consisting of a trough in which a commodity is movable in a direction transverse to the plane of the knife edge, one end of the commodity-supporting portion of the trough being cut off substantially along a plane transverse to the trough, and the other end of the commodity-supporting portion of the trough being cut off substantially along a plane at a substantial angle to the last mentioned plane, and a mounting for fixing the trough selectively in a normal position substantially perpendicular to the plane of the knife edge and in a reversed position with the opposite end of the trough toward the knife, the trough in such reversed position being more nearly horizontal and being transverse to its normal plane of reciprocation and transverse to a vertical plane through the axis of the knife, to permit a commodity to be sliced on an angle while it is held firmly seated in the trough by its own weight.

4. In a slicing machine having a circular knife rotatable on an inclined axis, a commodity holder mounted for reciprocation relative to the knife in a direction generally parallel to the plane of the knife edge, said commodity holder comprising a V-shaped trough above the plane of the knife edge in which a commodity is movable in a direction transverse to the plane of the knife edge, one end of the commodity-supporting portion of the trough being cut off substantially along a plane perpendicular to the axis of the trough, a mounting for fixing the trough selectively in a normal position with each of the sides of the trough at a substantial angle to the vertical and with said end of the trough substantially in the plane of the knife edge, and in a lower and more nearly horizontal position transverse to its normal plane of reciprocation, to permit a commodity to be sliced on an angle while it is held firmly seated in the trough by its own weight, and commodity-supporting means adapted to form a continuation of a wall of the trough in the latter position substantially in the plane of the wall of the trough to the plane of the knife edge.

GEORGE R. WOOD.